(12) United States Patent
Hu et al.

(10) Patent No.: US 8,560,014 B1
(45) Date of Patent: Oct. 15, 2013

(54) ADAPTER FOR COMMUNICATION DEVICE PROTECTIVE FRAME HAVING BACK COVER MOBILE POWER SOURCE AND THE PROTECTIVE FRAME

(75) Inventors: Li-Ming Hu, Taipei (TW); Yu-Chun Lu, Taipei (TW); Chih-Sheng Wang, Taipei (TW); Shih-Chin Huang, Taipei (TW)

(73) Assignee: Taer Inno Co., Ltd., Taipei (TW)

( * ) Notice: Subject to any disclaimer, the term of this patent is extended or adjusted under 35 U.S.C. 154(b) by 0 days.

(21) Appl. No.: 13/560,227

(22) Filed: Jul. 27, 2012

(30) Foreign Application Priority Data

Jul. 20, 2012 (TW) .............................. 101126252 A (51) Int. Cl.
*H04M 1/00* (2006.01)

(52) U.S. Cl.
USPC ........ 455/557; 455/572; 455/575.1; 439/501; 361/679.1

(58) Field of Classification Search
USPC ...................... 455/557, 572, 575.1; 439/501; 361/679.01
See application file for complete search history.

(56) References Cited

U.S. PATENT DOCUMENTS

| | | | | |
|---|---|---|---|---|
| 6,421,235 B2 * | 7/2002 | Ditzik | ........ | 361/679.3 |
| 6,428,348 B1 * | 8/2002 | Bean | ............ | 439/501 |
| 2002/0106934 A1 * | 8/2002 | Bean | ............ | 439/501 |
| 2003/0080630 A1 * | 5/2003 | Liu | ............ | 307/150 |
| 2009/0004907 A1 * | 1/2009 | Goldman et al. | ............ | 439/387 |
| 2009/0227122 A1 * | 9/2009 | Jubelirer et al. | ............ | 439/11 |
| 2011/0267199 A1 * | 11/2011 | Liu | ............ | 340/636.1 |
| 2013/0069431 A1 * | 3/2013 | Tseng | ............ | 307/43 |

* cited by examiner

*Primary Examiner* — Danh Le (57) ABSTRACT

An adapter is provided for a communication device. The adapter includes an elongated hollow shell and a foldable adapting element. The foldable adapting element includes an input half part and an output half part pivotally rotatable with each other between an expansion accommodating position and a fold operation position. The output half part includes an output port for a transmission connector in the communication device. The input half part includes a set of power input ends corresponding to the power output port in the back cover mobile power source of the communication device. When located in the fold operation position, the output port can be plugged into the transmission connector, and the power input ends can be correspondingly connected to the power output port.

8 Claims, 6 Drawing Sheets

ADAPTER FOR COMMUNICATION DEVICE PROTECTIVE FRAME HAVING BACK COVER MOBILE POWER SOURCE AND THE PROTECTIVE FRAME

BACKGROUND OF THE INVENTION

1. Field of the Invention

The present invention generally relates to an adapter; in particular, the present invention relates to the adapter for a communication device protective frame having a back cover mobile power source, as well as the protective frame.

2. Description of Related Art

Due to changes and progresses in modern people's daily lives, along with rapid advancement in communication technologies, various types of electronic communication products have been developed and released, such as smartphones like iPhone® or tablet computers e.g. iPad® from Apple Inc., to name a few, which are very popular in global markets. At present, such types of communication products have already become indispensible with regards to living and working aspects in modern society, and many people may even gradually have more than one handheld communication products.

Therefore, in order to compete in market to attract people's attention, many vendors and manufacturers made great efforts to numerous researches and designs thereby providing various fancy and powerful smart communication products. However, in chase of more application functions and display of higher resolutions, it typically also means the issue of electrical power consumption may aggravate and need to be compromised, which tends to cause insufficient sustention capability in use, and the benefit of hand-carry convenience featured by such mobile communication devices may vanish if the power supply issue can not be effectively resolved. Hence, when the user purchases such sorts of merchandises, the issues of battery sustention ability and handy power recharging operations are very critical.

So far, to avoid such an embarrassing situation of drained electric power, one most common solution to this issue is to additionally bring various types of backup batteries or chargers so as to deal with the high power consumption problem in these electronic communication devices. Whereas the use of such backup batteries and chargers may cause inconvenience and significantly reduce the portability of modern mobile communication devices. In particular, many smartphones or tablet computers actually do not allow easy detachment of built-in batteries, or otherwise, in an environment where external power sockets are not accessible, such rechargers may be useless, but become a burden for the user.

In view of such issues, mobile power source components are accordingly developed and applied. The differences between such components and backup batteries for replacement lie in that, on one hand, selections of backup power level are applicable, and various designs for combined installation with the protective frame are thus gradually introduced; for example, according to the disclosure of the patent application serial number 100136397 claimed by the Assignee, the user can freely combine them to a protective frame or detach them independently thereby allowing flexibility in choices. Moreover, simply with respect to smartphone cases, they are still too rigid, dull and monotonous for many users. As such, lots of people may additionally install the mobile phone frame exhibiting special or personalized patterns so the phone may appear more amusing. Even so, the configuration of mobile power source in combination with the protective frame and feasible power supply approaches still need to be exquisitely arranged so as to maintain the aesthetic design and the delicate profile in such mobile communication devices themselves.

Accordingly, the present invention is addressed to combine the ideas of protective frame and mobile power source thereby providing an innovative device accessory which can, in addition to conjunction of the mobile power source into the back cover, operate as a convenient and tiny adapter for applications. In operation, it enables direct powering to the mobile device installed inside the protective frame. Even in an idle state, the adapter can otherwise act as a decorative phone strap which improves integral aesthetic design and, particularly in combination with the mobile power source and the protective frame, increases convenience in hand-carry features due to accessory simplifications.

SUMMARY OF THE INVENTION

As such, an objective of the present invention is to provide a foldable adapting element having an elongated hollow shell, in which the elongated hollow shell can accommodate and protect the adapter therein and can be suspension buckled to the protective frame of the communication device with a buckle ring thereby enabling hand-carry convenience for the user to offer the best portability.

Another objective of the present invention is to provide a foldable adapting element which can be suitably adjusted and folded based on application conditions, such that, upon being set to an operation position, it can exhibit a delicate and elegant foldable profile for linkage of the mobile power supply and the communication device such that the mobile power supply hidden in the back cover and the communication device can be exquisitely connected in conductivity.

Yet another objective of the present invention is to provide a foldable adapting element having additional Universal Serial Bus (USB) transmission ports so that it is possible to electrically recharge the mobile power supply through the USB transmission port or otherwise transfer electric power to the mobile communication device for use thereby increasing flexibility in applications.

Still another objective of the present invention is to provide a protective frame allowing the mobile power source to act as the protective frame back cover of the communication device such that, while the protective frame protects the internal components of the communication device, it can also, in conjunction with the foldable adapting element, allow the mobile power source acting as the back cover to supply electric power anytime for the communication device under emergent power supply situations.

To achieve the aforementioned objectives, the present invention provides an adapter for a communication device protective frame having a back cover mobile power source and the protective frame, wherein the communication device includes a display front side, a back side opposite to the front side and a surrounding lateral side connecting the display front side and the back side, and the communication device further includes an enable transmission connector configured on the surrounding lateral side, in which the protective frame includes a frame body for fixing and protecting the communication device and exposing the enable transmission connector, and a back cover mobile power source configured on the frame body and placed on the back side of the communication device, and the back cover mobile power source has a power output port.

Herein the adapter comprises: an elongated hollow shell; and a foldable adapting element to be accommodated within the elongated hollow shell, wherein the foldable adapting element includes an input half part and an output half part pivotally rotatable with each other between an expansion accommodating position and a fold operation position; wherein the output half part includes an output port complementarily corresponding to the enable transmission connector, and the input half part includes a set of power input ends corresponding to the power output port in the back cover mobile power source, such that, when the input half part and the output half part are located at the fold operation position, the output port can be plug connected to the enable transmission connector and the power input ends can be correspondingly connected in conductivity to the power output port; and, when the input half part and the output half part are located at the expansion accommodating position, the foldable adapting element can be accommodated within the elongated hollow shell.

In brief, the present invention provides a device different from conventional adapters and protective frames, which integrates the mobile power source, the protective frame of the mobile device and the adapter into a single module by mutually connecting such parts in a particular form so that, while the protective frame protecting the structure of the communication device, it can also allow the mobile power source to act as an emergent power supply for the communication device thereby offering benefits with regards to both device portability and solutions for emergent conditions. Besides, because of exquisite structural design in the adapter, it facilitates user friendliness with handy and simple combination. Furthermore, the USB transmission port configured on the adapter can charge the mobile power source or provide electric power to the mobile communication device thereby increasing flexibility in applications. In summary, the present invention improves existing technologies and certainly facilitates significant advancement as well as high market value, thus achieving all of the aforementioned objectives.

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the present invention in conjunction with the appended drawings. Moreover, same components in the Figures will be herein marked with similar symbols in each of the embodiments.

A first preferred embodiment according to the present invention is shown in FIGS. 1 to 5, illustrating an adapter for a communication device protective frame having a back cover mobile power source and the protective frame. Initially, with reference to FIGS. 1 and 2, the communication device 9 in the present invention generally indicates a commonly used smartphone or tablet computer and the like, and, for brevity, is herein defined as comprising a display front side 91, a back side 92 opposite to the display front side 91, and a surrounding lateral side 93 connecting the display front side 91 and the back side 92. Especially, the aforementioned communication device 9 is further characterized in an enable transmission connector 94 installed on the surrounding lateral side 93 for power recharging or other signal transmissions. Hereunder a common iPhone® smartphone from Apple Inc. is exemplified in the Figures for the purpose of illustrations.

Figure 1:
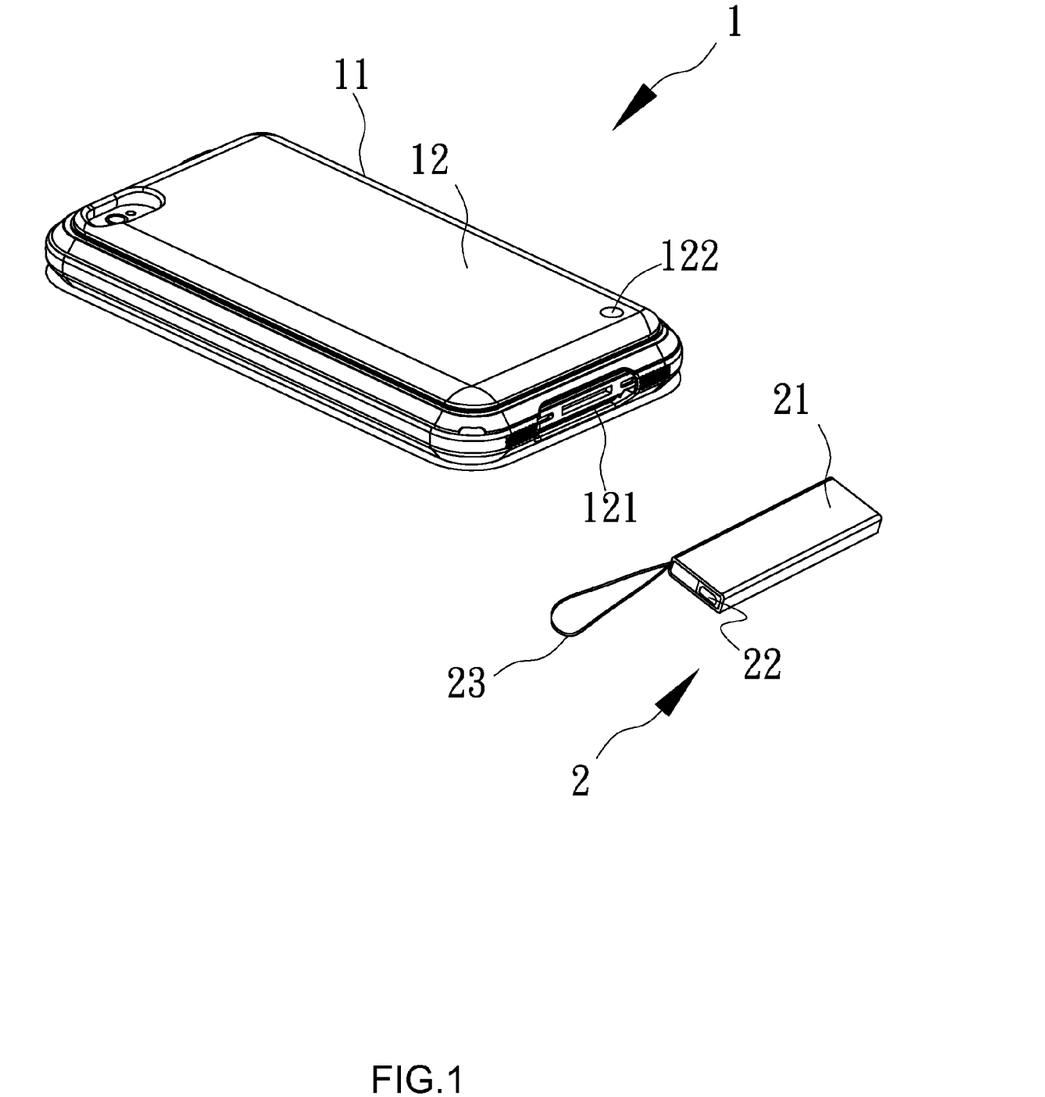
FIG. 1 shows a structural diagram for a first preferred embodiment according to the present invention.
Figure 2:
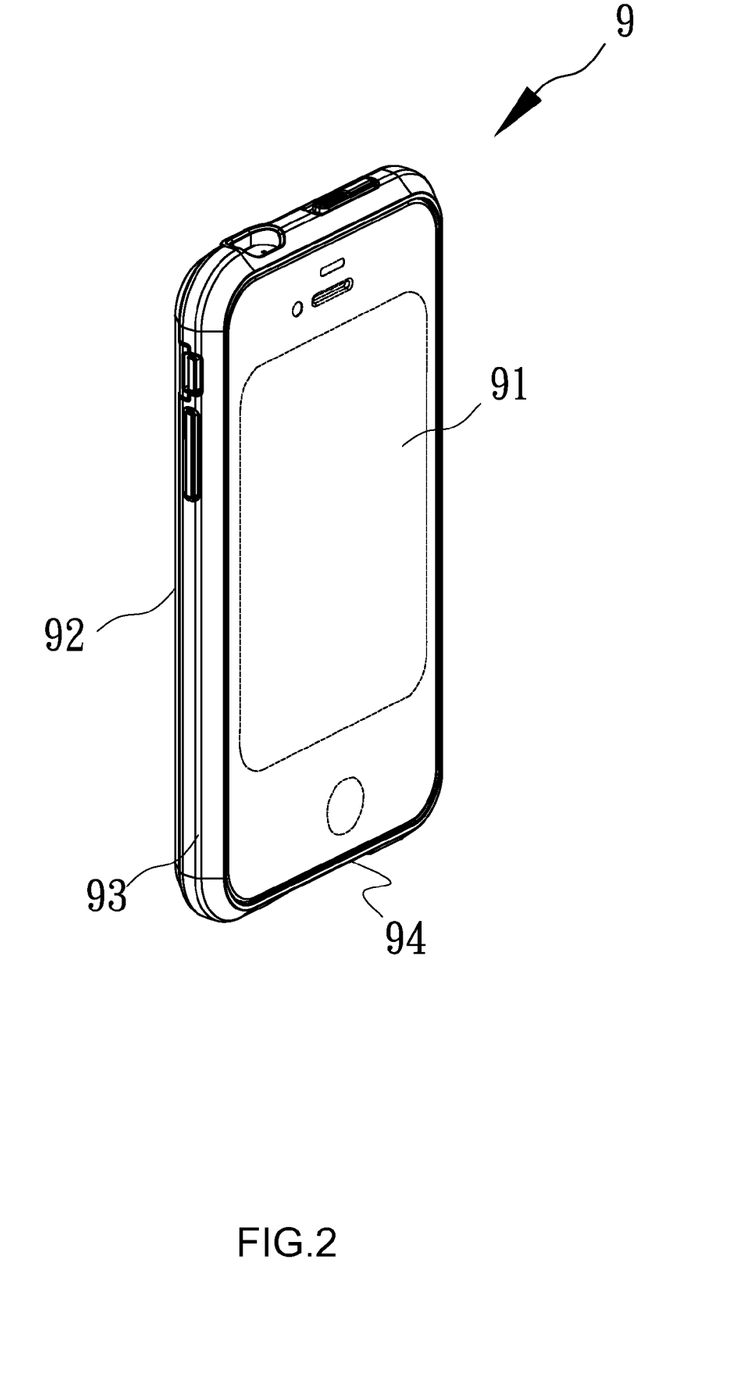
FIG. 2 shows a structural diagram for the communication device illustrated in the embodiment of FIG. 1.

The communication device protective frame 1 includes a frame body 11 for fixing and protecting the communication device 9, and in the present invention a mobile power source is further installed therein to act as the back cover for the communication device protective frame 1, demonstrated as the back cover mobile power source 12 in the present invention. Additionally, the back cover mobile power source 12 also includes a power output port 121 as the power output interface for connection in conductivity to the enable transmission connector 94 in the communication device 9. Also, the back cover mobile power source 12 further includes a power indicator 122 to specify the power status in the back cover mobile power source 12 so that the user can appreciate the remained power in the back cover mobile power source 12 by way of the power indicator 122.

Figure 3:
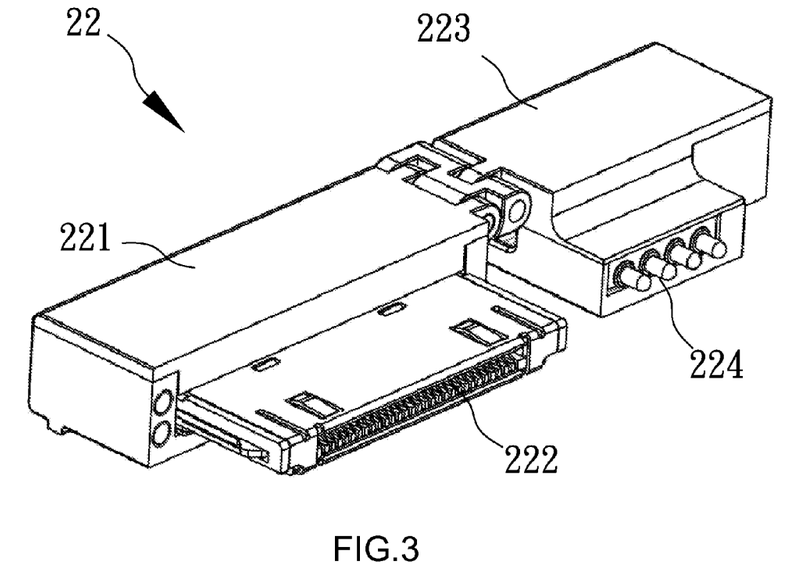
FIG. 3 shows a structural diagram for the foldable adapting element of FIG. 1 when located at the expansion accommodating position.

The adapter 2 essentially comprises an elongated hollow shell 21 and a foldable adapting element 22 to be accommodated within the elongated hollow shell 21. More specifically, the elongated hollow shell 21 is designed to present a simple and elegant profile to enhance product attraction; in practice, a central accommodation space is formed inside the elongated hollow shell 21 so that, when the foldable adapting element 22 is in an idle state, the user can stretch it to an expansion accommodating position as shown in FIG. 3. For better illustrations, the foldable adapting element 22 is divided into an input half part 221 and an output half part 223, and a pivotal axis is configured at the joint thereof so these two parts can pivotally rotate with each other. Herein the input half part 221 includes a set of power input ends 222 corresponding to the power output port 121 of the back cover mobile power source 12 such that, through the power output port 121, the electricity in the back cover mobile power source 12 can be conducted to the power input end 222 of the input half part 221. Meanwhile, the output half part 223 includes an output port 224 complementarily corresponding to the enable transmission connector 94 such that the output port 224 at the joint can be readily plug connected to the enable transmission connector 94.

At this moment, the input half part 221 and the output half part 223 conjunctively constitute an open structure such that the foldable adapting element 22 can be directly disposed therein through a lateral opening (not shown) in the elongated hollow shell 21 for accommodation within the elongated hollow shell 21 thereby allowing convenient accesses and protections from outside dusts or dirt which may adversely affect the electrical transmission function. Also, in the present embodiment, the external wall surface of the elongated hollow shell 21 can be further configured with a suspension buckle structure for the phone strap 23 such that the adapter 2 can be suspension buckled to a hole (not shown) of the aforementioned communication device protective frame 1 so as to allow the user to carry it in hand conveniently.

Figure 4:
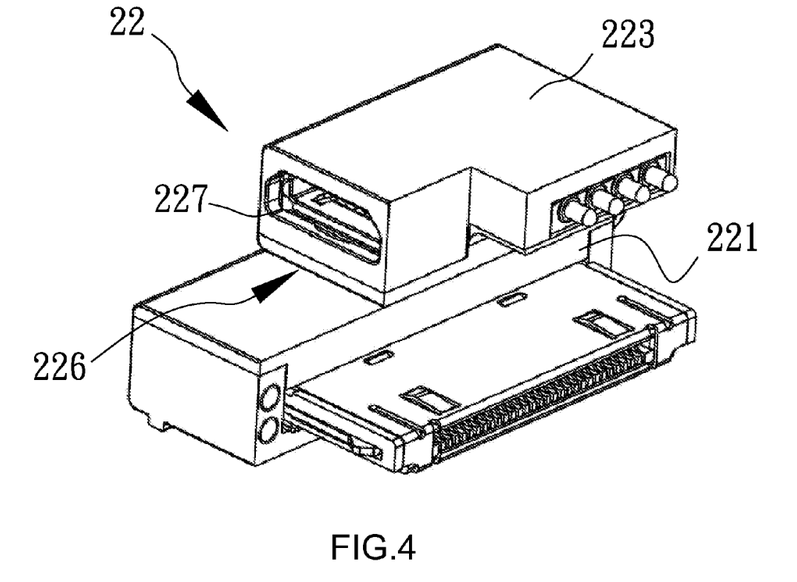
FIG. 4 shows a structural diagram for the foldable adapting element of FIG. 1 when located at the fold operation position.
Figure 5:
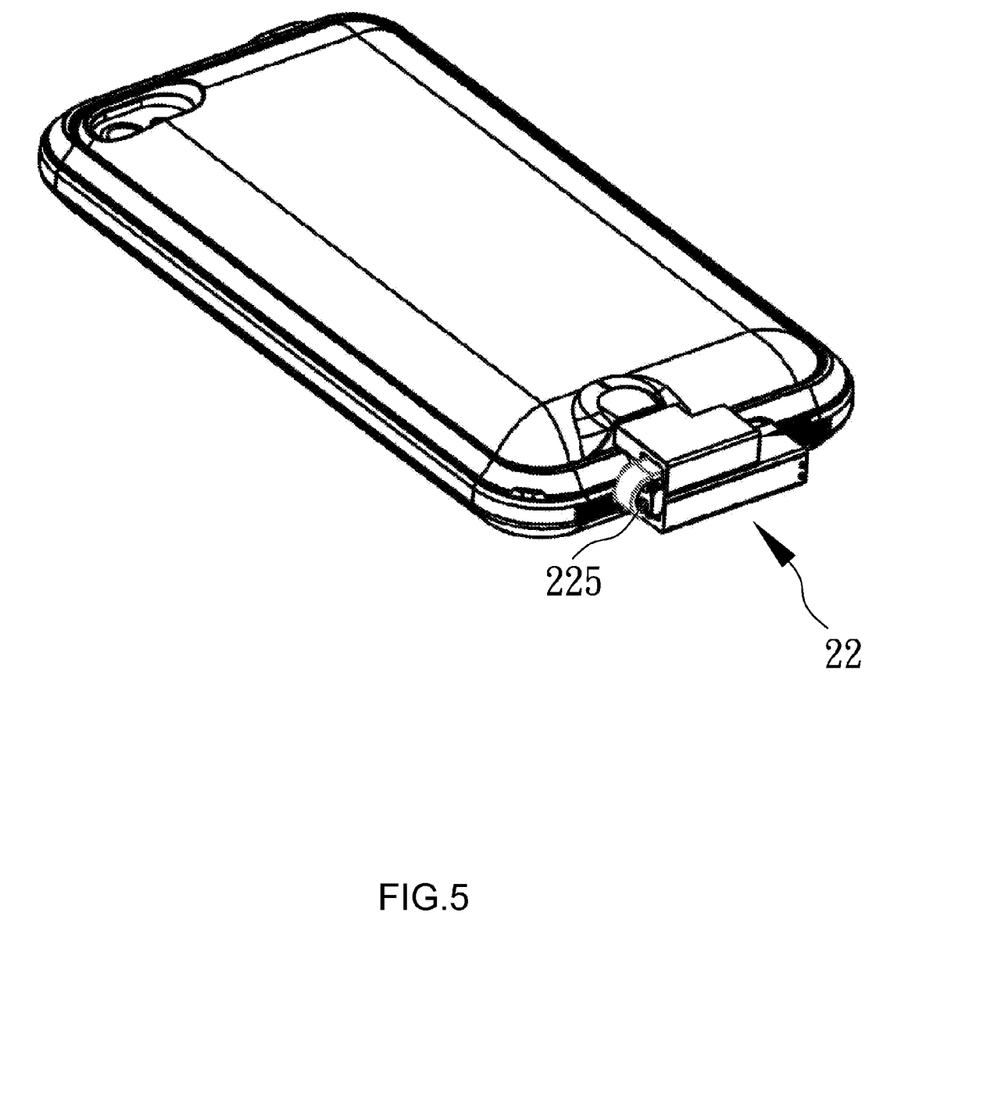
FIG. 5 shows a structural diagram for connecting the foldable adapting element to the communication device protective frame and the communication device.

Then, when located at the fold operation position as shown in FIGS. 4 and 5, the above-said two half parts can be mutually connected in conductivity at the bending portion by means of a set of cables 225 in the foldable adapting element 22 such that, when located at the fold operation position, it is possible to exploit the flexibility feature of the cable 225 to link the two ends respectively from the input half part 221 and the output half part 223 to maintain the electrical connection between them. Furthermore, when the foldable adapting element 22 is located at the fold operation position, the two top sides facing each other further include a set of magnetic elements 226 thereby, when located at the fold operation position, allowing stable and firm placement of the input half part 221 and the output half part 223 at the relative positions thereof through magnetic attraction. Therefore, in practice, the user needs only to perform simple folding and insertion operations to exquisitely connect in conductivity the foldable adapting element 22 to the back cover mobile power source 12 and the communication device 9, thus that, by way of such a handy combination, it is possible to enable the back cover mobile power source 12 to act as the emergent power supply for the communication device 9.

Figure 6:
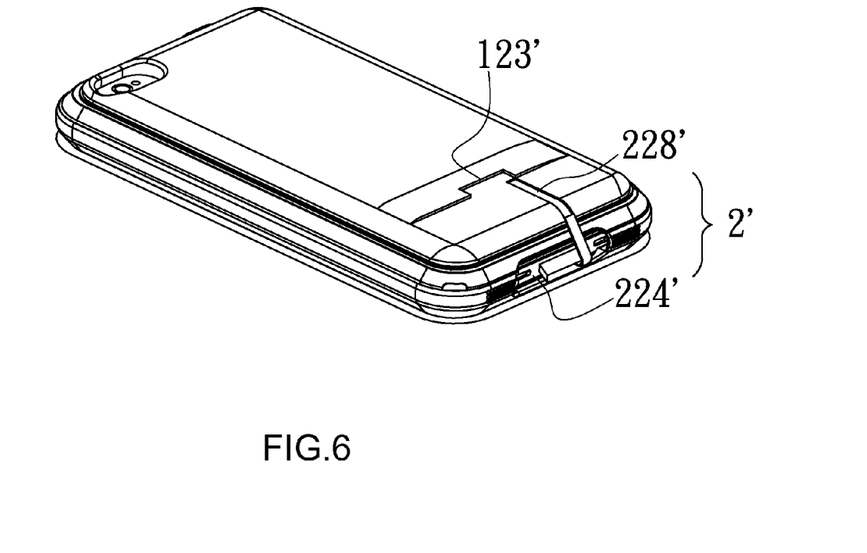
FIG. 6 shows a structural diagram for a second preferred embodiment according to the present invention.

On the other hand, the back cover mobile power source 12 itself is also a rechargeable battery, so that, in case the power in the back cover mobile power source 12 itself is insufficient, it needs to be electrically recharged through an external power source for repeated applications as well. Consequently, as shown in FIG. 4, the foldable adapting element 22 further includes a transmission port 227 for receiving an external power supply. In the present embodiment, it is exemplified as a Universal Serial Bus (USB) transmission port for transferring information or electric power in order to allow the user to choose a common USB slot as the enable transmission port 227 for the connection to the foldable adapting element 22, then it is possible not only to provide electric power to the communication device 9, but to electrically recharge the back cover mobile power source 12 in the present embodiment so as to further improve the application flexibility of the present invention. Additionally, it should be noted that those skilled ones in the art can certainly take other factors, e.g., product research and development costs or actual market demands and the like, into consideration to adopt another type of slot, which does not limit the implementation of the present invention. Of course, those skilled ones in the art can also easily appreciate that the aforementioned adapter is in effect not a restriction. A second preferred embodiment of the present invention is shown in FIG. 6. The differences between the present and the previous embodiments essentially lie in that, the adapter 2' comprises a recess 123' corresponding to the back cover mobile power source and an output port 224' complementarily corresponding to the aforementioned enable transmission connecter 94 as well as a flexible cable 228', and it is not attached to the frame body in a suspension buckle approach as described above. In the idle state, the output port 224' is embedded into the recess 123' on the back side of the back cover mobile power source. In operation, the adapter 2' can be directly pulled out from the above-said recess 123' and then inserted into the enable transmission port 94 of the communication device 9 for power provision such that the user needs not to carry other connection materials but freely enjoys the fashionable perspective, and the need for power transmission can be fulfilled thus achieving the same effects as illustrated with respect to the previous embodiment.

Figure 7:
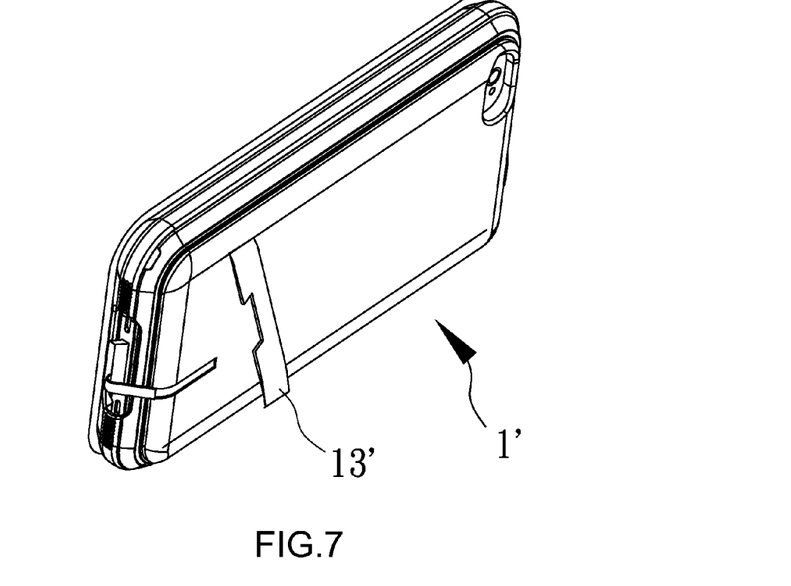
FIG. 7 shows a structural diagram for mounting the protective frame on a plane with a supporter in FIG. 6.

However, due to the idea of slim and tiny functional design, the smartphone may not provide any supportive items to allow it to stand up. For this, as shown in FIG. 7, the present embodiment is further configured with a pivotally rotatable supporter 13' in the communication device protective frame 1' such that the user can dispose the communication device on a table at a suitable and cozy angle so the communication device can be viewed and controlled in a more ergonomic way.

Figure 8:
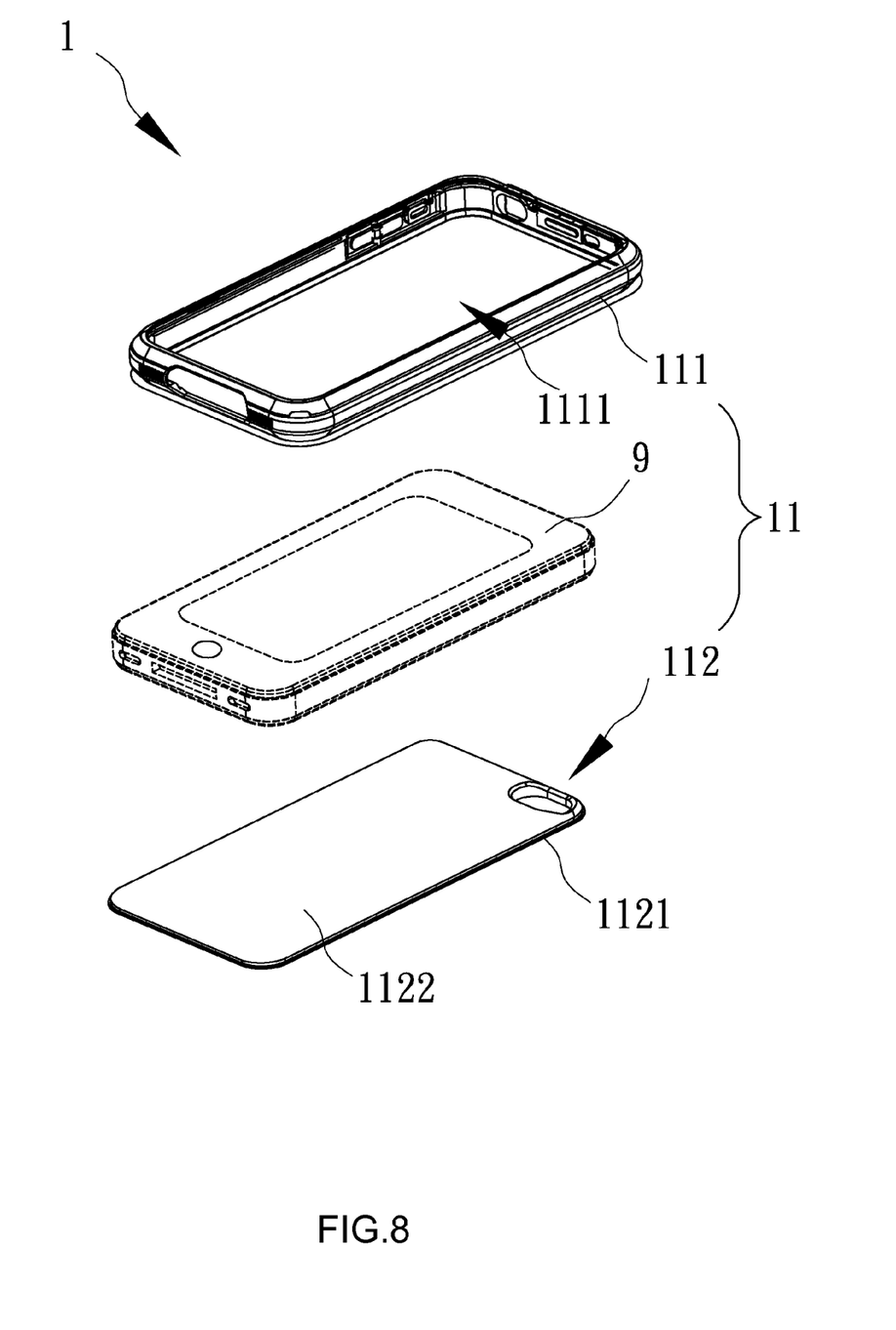
FIG. 8 shows a structural diagram for the frame body according to the present invention.

More specifically, the frame body 11 in the communication device protective frame 1 of the present invention, as shown in FIG. 8, further includes a main frame part 111 and an auxiliary frame part 112. Herein the main frame part 111 extends out a central recess accommodating part 1111 inwardly recessed in configuration, so the communication device can be firmly disposed in such a central recess part; meanwhile, the auxiliary frame part 112 correspondingly overlaps with the main frame part 111, and has a suppressive area 1121 for at least partially suppressing the communication device to secure the communication device in position inside the frame, as well as a light transfer area 1122 for exposing the display front side.

Although the present invention has been disclosed in accordance with the embodiments as previously illustrated, they are in every aspects not intended to limit the present invention; any skilled persons in the art can certainly make changes and modifications without departing from the spirit and range of the present invention, thus that the claimed scope of the present invention should be considered as being delineated by the claims set forth hereunder.

What is claimed is:

1. An adapter for a communication device protective frame having a back cover mobile power source, wherein the communication device includes a display front side, a back side opposite to the front side and a surrounding lateral side connecting the display front side and the back side, and the communication device further includes an enable transmission connector configured on the surrounding lateral side, in which the protective frame further includes a frame body for fixing and protecting the communication device and exposing the enable transmission connector, and a back cover mobile power source configured on the frame body and placed on the back side of the communication device, and the back cover mobile power source has a power output port, wherein the adapter comprises:

an elongated hollow shell; and a foldable adapting element to be accommodated within the elongated hollow shell, wherein the foldable adapting element includes an input half part and an output half part pivotally rotatable with each other between an expansion accommodating position and a fold operation position; wherein the output half part includes an output port complementarily corresponding to the enable transmission connector, and the input half part includes a set of power input ends corresponding to the power output port in the back cover mobile power source, such that, when the input half part and the output half part are located at the fold operation position, the output port can be plug connected to the enable transmission connector and the power input ends can be correspondingly connected in conductivity to the power output port; and, when the input half part and the output half part are located at the expansion accommodating position, the foldable adapting element can be accommodated within the elongated hollow shell.

2. The adapter according to claim 1, wherein the foldable adapting element further includes a transmission port for receiving an external electric power supply.

3. The adapter according to claim 1, wherein the foldable adapting element further includes a set of cables in which one ends thereof are connected to the input half part and the other ends connected to the output half part.

4. The adapter according to claim 1, wherein the input half part and the output half part in the foldable adapting element include top planes which face toward each other when located at the fold operation position, and the foldable adapting element further includes a set of magnetic elements for mutual magnetic attraction between the input half part and the output half part when located at the fold operation position.

5. The adapter according to claim 1, wherein the elongated hollow shell further includes a phone strap for suspension connecting the adapter to the mobile communication device protective frame.

6. A protective frame for communication device having a back cover mobile power supply, wherein the communication device includes a display front side, a back side opposite to the front side and a surrounding lateral side connecting the display front side and the back side, and the communication device further includes an enable transmission connector configured on the surrounding lateral side, in which the protective frame includes:
  a frame body for fixing and protecting the communication device and exposing the enable transmission connector;
  a back cover mobile power source configured on the frame body and placed on the back side of the communication device, in which the back cover mobile power source has a power output port; and
  an adapter, comprising:
    an elongated hollow shell; and
    a foldable adapting element to be accommodated within the elongated hollow shell, wherein the foldable adapting element includes an input half part and an output half part pivotally rotatable with each other between an expansion accommodating position and a fold operation position; wherein the output half part includes an output port complementarily corresponding to the enable transmission connector, and the input half part includes a set of power input ends corresponding to the power output port in the back cover mobile power source, such that, when the input half part and the output half part are located at the fold operation position, the output port can be plug connected to the enable transmission connector and the power input ends can be correspondingly connected in conductivity to the power output port; and, when the input half part and the output half part are located at the expansion accommodating position, the foldable adapting element can be accommodated within the elongated hollow shell.

7. The protective frame for communication device having a back cover mobile power supply according to claim 6, wherein the frame body further includes:
  a main frame part forming a closed structure, in which the main frame part constitutes a central recessed accommodating part for accommodation of the communication device; and
  an auxiliary frame part having a closed structure for correspondingly overlapping with the main frame part, in which the auxiliary frame part includes a suppressive area for at least partially suppressing the communication device, and a light transfer area for exposing the display front side.

8. The protective frame for communication device having a back cover mobile power supply according to claim 6, wherein the back cover mobile power source further includes a power indicator.

* * * * *